United States Patent
Kneusel

[11] 3,815,534
[45] June 11, 1974

[54] PRESSURE RELEASE VALVES FOR AEROSOL CANS

[75] Inventor: Raymond H. P. Kneusel, Flourtown, Pa.

[73] Assignee: Crown Cork & Seal Company, Inc., Philadelphia, Pa.

[22] Filed: Nov. 18, 1971

[21] Appl. No.: 199,929

[52] U.S. Cl. ............................ 113/15 A, 113/121 C
[51] Int. Cl. .............................................. B21d 51/26
[58] Field of Search ....... 113/1 F, 116 DD, 116 QH, 113/121 A, 121 C, 15 A; 220/89 A, 44 R; 222/397

[56] References Cited
UNITED STATES PATENTS

| | | | |
|---|---|---|---|
| 1,954,816 | 4/1934 | Hothersall | 113/121 A |
| 3,074,602 | 1/1963 | Shilady et al. | 220/89 A |
| 3,292,826 | 12/1966 | Abplanap | 220/89 A |
| 3,339,789 | 9/1967 | Stolle et al. | 220/54 |
| 3,356,257 | 12/1967 | Eimer | 220/89 B |
| 3,484,817 | 12/1969 | Wood | 220/89 A |
| 3,515,308 | 6/1970 | Hayes | 220/89 A |
| 3,658,206 | 4/1972 | Barbier | 220/89 A |
| 3,722,734 | 3/1973 | Raidl | 220/89 A |

Primary Examiner—Charles W. Lanham
Assistant Examiner—M. J. Keenan
Attorney, Agent, or Firm—Woodcock, Washburn, Kurtz & Mackiewicz

[57] ABSTRACT

A pressure release valve is located in the domed bottom of an aerosol can. A centrally located area in the domed bottom having a lesser resistance to eversion than the peripheral area in the domed bottom includes several score lines which meet at a common point in a spoke-like configuration. The flat area of the bottom will evert at a pressure of 170 to 200 p.s.i. so as to rupture the bottom at the score lines before any substantial eversion of the peripheral area occurs.

9 Claims, 23 Drawing Figures

PATENTED JUN 11 1974 3,815,534
SHEET 1 OF 3

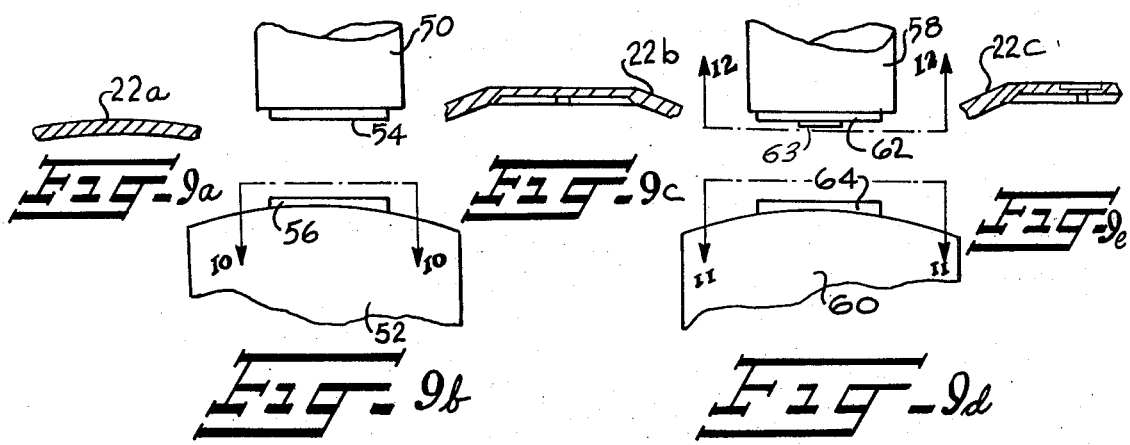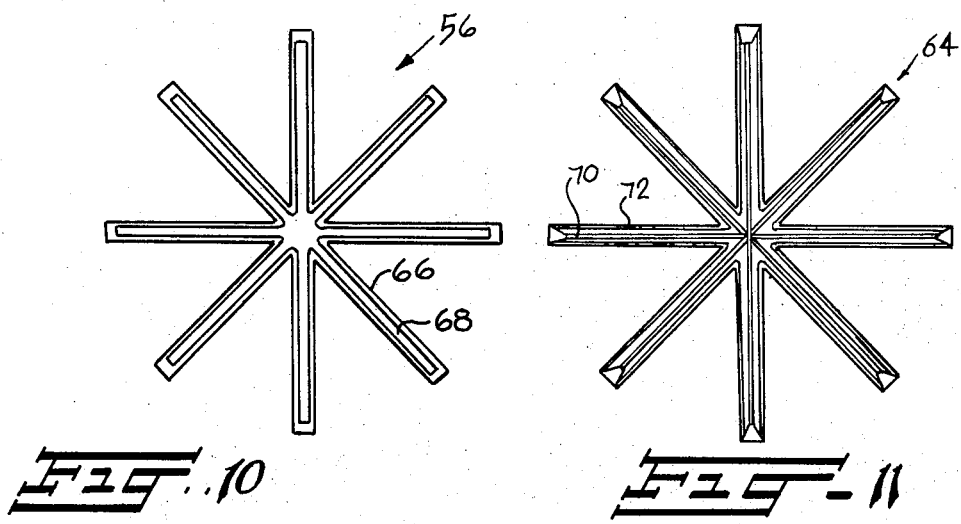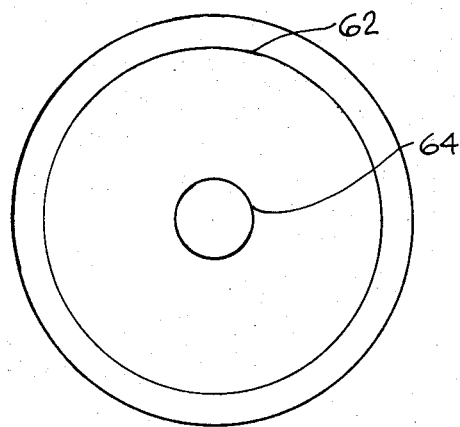

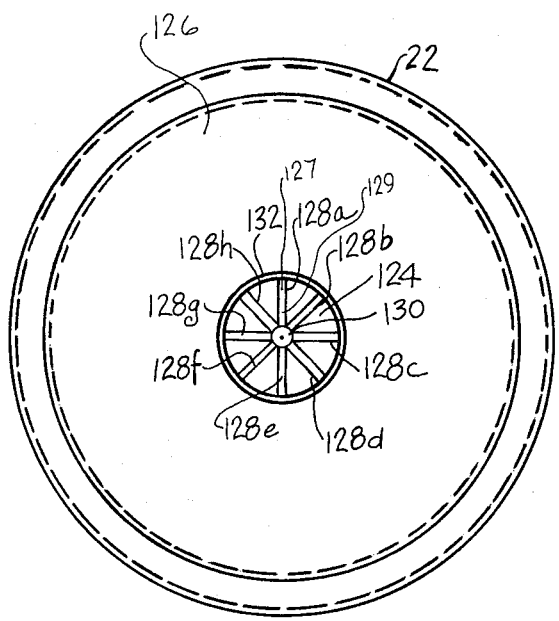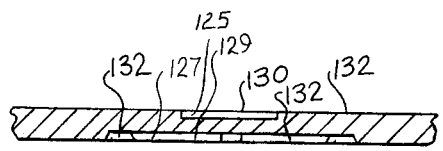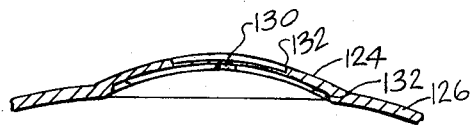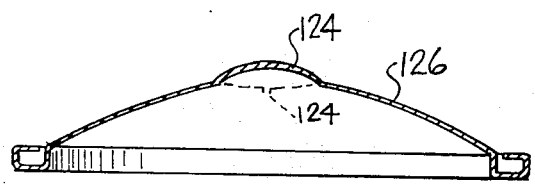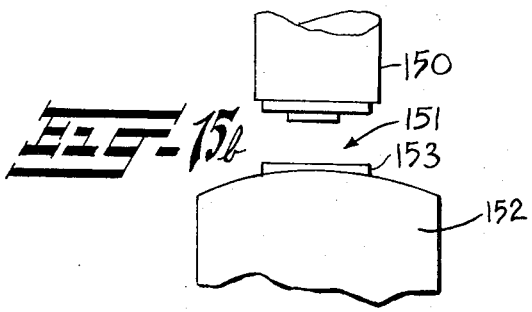

PRESSURE RELEASE VALVES FOR AEROSOL CANS

BACKGROUND OF THE INVENTION

1. Field of the Invention

Cans of the aerosol type having an internal propellant, such as Freon, are potentially dangerous. When such a container is subjected to excessive temperatures, dangerously high pressure levels are generated within the container. Under these conditions, the can bottom will evert and explode and portions of the can may be propelled at dangerously high velocities. Such conditions may occur when the can is incinerated and even during storage at high temperatures. In order to provide for the safe release of a pressure build-up within the can, a safety valve must be provided.

2. The Prior Art

The prior art has suggested the use of scoring to provide pressure release valves in various areas of an aerosol can. U.S. Pat. No. 3,074,602 — Shillady et al. discloses a pressure release valve which is formed by scoring the valve cup of an aerosol can. The scoring supposedly occurs at a point of maximum deformation when the can is subjected to abnormally high pressure levels within. This distortion of the valve cup in the area of weakness is intended to rupture the cup so as to safely release the pressure build-up. A circular score line and a score point are disclosed in two different embodiments of the Shillady et al. patent.

U.S. Pat. No. 3,292,826 — Abplanalp discloses a pressure release valve formed by at least partially circumscribing a line of weakness, e.g., a score line, over a relatively large section of an aerosol can wall. As suggested in the Abplanalp specification, the line of weakness may be located at the various portions of the container but should not be located on the bottom wall since the discharge of pressure against the surface on which a conventional can rests would, even with the Abplanalp valve, tend to displace the can from that surface and this would be objectionable.

The particular pressure release valves described in the above-discussed patents have a number of disadvantages. The failure of the valves to release pressure build-ups within a narrow pressure range of 170 p.s.i. to 200 p.s.i. is just one of these disadvantages. Although the Shillady et al patent does indicate an effective range of 175 to 200 p.s.i. for the valve, such a valve is not consistently effective in this range. The reason for this is in large part due to the small size of the Shillady scored area which requires a very small residual thickness and this small thickness results in an unreliable release of pressure.

The Abplanalp circular score line which is located in the cylindrical wall of the can body also requires a very small residual thickness, e.g., 0.001 inches assuming a circular score line diameter of 1 inch. This small residual thickness would be required since there is little or no deformation of the cylindrical wall outside the score line. However, such a small residual thickness is difficult to achieve in commercial production due to inclusions and variations in the metal thickness. The result is the unreliable release of pressure from the can. Since pressure approaching 200 p.s.i. will result in the eversion of most aerosol can bottoms with the resulting unraveling of the double seam along the periphery of the bottom, it is imperative that the pressure release occur before this dangerously high pressure is reached.

It is of course just as important to avoid a premature release of pressure; i.e., a release below the 170 p.s.i. level. This is extremely important since a pressure of perhaps 160 p.s.i. may be reached during normal operation without any real danger of explosion at that pressure level. Therefore, any release of a pressure build-up of 160 p.s.i. may result in the unnecessary destruction of an aerosol can and its contents.

Another disadvantage of the prior art pressure release valves relates to the aesthetic properties of the aerosol can. Readily visible score lines which appear on the exterior of the can are not pleasing to the eye. This is particularly true where the score line is located on the exterior side of the can side wall and extends over a large area as shown in the Abplanalp patent.

The manufacturing technique which is utilized in making the pressure release valves in the Shillady et al. patent represents a further disadvantage. The Shillady et al. patent discloses the use of a tungsten inert gas shielded electric arc to score the valve cup of the aerosol can. As the Shillady et al. patent cautions, this technique may result in excessive scoring so as to create a hole in the valve cup. Furthermore, this method of scoring is relatively costly and therefore not particularly suitable for the can industry where low cost high speed production is required.

SUMMARY OF THE INVENTION

It is an object of this invention to provide a method of making an aerosol can with a safety valve which will reliably release a pressure build-up before a dangerously high pressure level is reached.

It is another object of this invention to provide a method of making a safety valve which will not prematurely release a pressure build-up.

It is a further object of this invention to provide a method of making a safety valve in an aerosol can which does not adversely affect the aesthetic properties of the can.

It is also an object of this invention to provide a method of making a safety valve for an aerosol can which is inexpensive to manufacture.

It is still a further object of this invention to provide a method of making a safety valve in an aerosol can bottom which does not result in the propelling of the can upon release even when the can rests upon its bottom.

In accordance with these and other objects, an aerosol container is made by shaping and scoring an aerosol container bottom blank so as to form an outwardly concave peripheral portion having a predetermined deformation resistance to everting forces and a scored valve portion including intersecting score lines and having a deformation resistance to the aforesaid everting forces relatively less than said predetermined deformation resistance.

In accordance with one important aspect of the invention, the valve portion is first scored so as to form a rough score line and then scored so as to form a fine score line at the base of the rough score line leaving a residual thickness of 0.002–0.005 inches. The container bottom blank is shaped by simultaneously deforming the container bottom blank to form a flat valve portion and scoring said flat valve portion to form the rough scored line.

In accordance with another important aspect of the invention, the container bottom blank may be shaped so as to form a flat valve portion and then scored around within the valve portion. The blank may then be further shaped so as to form a bulging valve portion having a smaller radius of curvature than the concave peripheral portion of the container blank.

BRIEF DESCRIPTION OF THE DRAWINGS

FIGS. 9 (a–e) depict a method of making the safety valve in the embodiment of FIGS. 1–6;

FIG. 10 is a plan view of the rough scoring taken along line 10—10 of FIG. 9b;

FIG. 11 is a plan view of the fine scoring punch taken along line 11—11 in FIG. 9d;

FIG. 12 is a plan view of the fine scoring anvil taken along line 12—12 of FIG. 9d;

FIG. 13 is a sectional view of a domed bottom which may be double seamed to the cylindrical side wall portion of the can of FIG. 1 in accordance with another embodiment of this invention;

FIG. 14 is a plan view of the exterior side of the can bottom shown in FIG. 2 showing the safety valve of this invention; and FIGS. 15 (a–e) depict a method of making the safety valve in the embodiment of FIGS. 13 and 14.

DETAILED DESCRIPTION OF A PREFERRED EMBODIMENT

Figure 1:
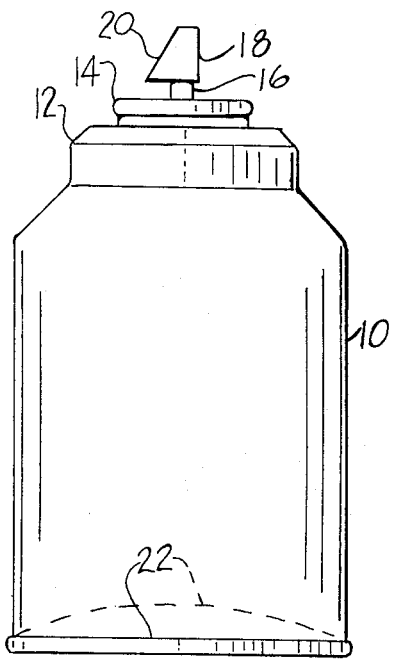
FIG. 1 is an elevational view of an aerosol can of the type embodying the invention.

An aerosol can as shown in FIG. 1 comprises a side wall portion 10 and a top portion 12 receiving a valve assembly including a valve cup 14, a valve stem 16, and a nozzle 18 adapted to be pushed by a finger at a surface 20. A domed bottom wall portion 22 is double seamed to the bottom edge of the side wall portion 10.

Figure 2:
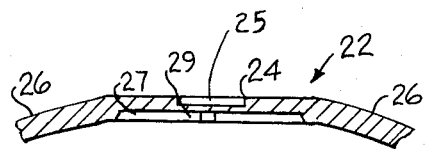
FIG. 2 is a sectional view of a domed bottom which may be double seamed to the cylindrical side wall portion of the can of FIG. 1 in accordance with one embodiment of this invention.
Figure 3:
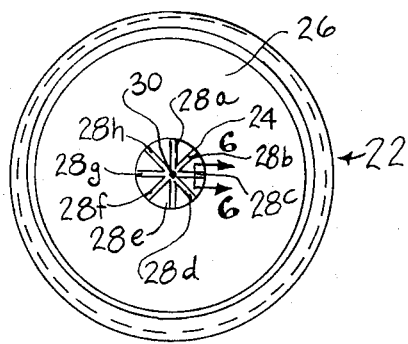
FIG. 3 is a plan view of the exterior side of the can bottom shown in FIG. 2 showing the safety valve of this embodiment.

In accordance with one embodiment of this invention as shown in FIGS. 2 and 3, the aerosol can of FIG. 1 is provided with a safety valve comprising a scored flat area 24 which is centrally located in the domed bottom 22 and surrounded by an outwardly concave peripheral area 26. The several score lines 28 (a–h) in the flat area 24 meet at a common point 30 to form a spoke-like design. The score line pairs 28a and 28e, 28b and 28f, 28c and 28g, and 28d and 28h are located on diametrically opposite sides of the point 30.

Figure 5:
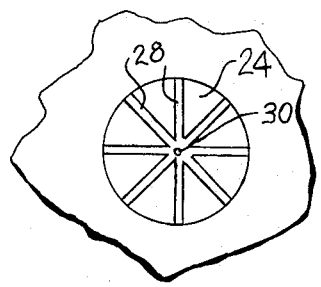
FIG. 5 is a partial plan view of the exterior side of the can bottom of FIGS. 2 and 3 after release by the valve.
Figure 4:
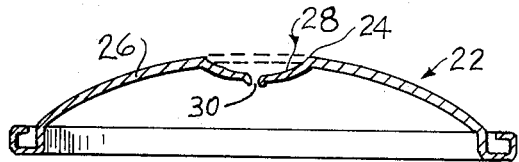
FIG. 4 is a sectional view of the can bottom of FIGS. 2 and 3 after release by the valve.

As may be seen by reference to FIGS. 4 and 5, the flat area 24 will evert outwardly as a result of the pressure build-up so as to rupture the bottom 22 at the point 30 thereby releasing the pressure build-up. However, the peripheral concave area 26 of the bottom 22 does not evert. Tests have revealed that the hole at 30 is so small, as to pass only 2.3 cubic feet per minute of air at 160 p.s.i. This is insufficient to significantly move the can on a horizontal supporting surface. Also, the deformation which is shown as exaggerated is such that the can will return substantially to its undeformed position after pressure release thereby limiting product spillage by substantial closing of the hole at 30.

In accordance with this invention, the bottom 22 will rupture at a pressure no less than 170 p.s.i. and a pressure no greater than 200 p.s.i. In order to achieve pressure release, within this pressure range, various aspects of the score lines 28a–h and the flat area 24 must be carefully controlled. For example, it has been found that a scoring depth residual thickness of 0.002–0.005 is necessary in order to release the pressure in the range of 170 to 200 p.s.i. Actually, a scoring depth in combination with a stepped circular indentation 25 leaving a residual thickness of 0.004 inches in the region 27 of the spokes 28 and a residual thickness of 0.003 inches in the region 29 of the spokes 28 which lies beneath the indentation 25 is preferred to achieve a release pressure of 170 to 185 p.s.i. Preferably, the diameter of the indentation 25 is nine thirty-seconds of an inch.

Figure 6:
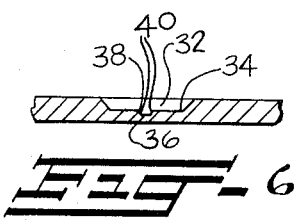
FIG. 6 is a sectional view of a score line taken along line 6—6 in FIG. 3.

In order to assure the attainment of this appropriate residual thickness, a compound score line as shown in FIG. 6 is preferred. The flat area 24 is first rough scored to form a line 32 having a base 34. The base 34 is then fine scored to the appropriate residual thickness at the base 36 of a fine score line 38. It has been found that a width of 0.002 to 0.004 inches (preferably 0.0025 inches) at the base 36 and an angle 40° to 60° (preferably 50°) between walls 40 of the lines 38 will result in score lines which will reliably release the pressure at the appropriate level.

Figure 7:
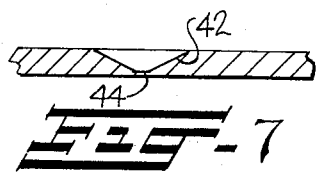
FIG. 7 is a sectional view of another type of score line.

Although the compound score line is preferred, a conventional score line shown in FIG. 7 may be utilized if the appropriate residual thickness can be achieved. Again, it has been found desirable to provide a 40° to 60° angle between the walls 42 with 50° preferred and a width of 0.002 to 0.004 inches with 0.0025 inches preferred at the base 44.

It is not only important to assure release before the pressure build-up reaches a level at which the double seamed bottom may unravel and evert, it is also important to avoid premature release of pressure by the valve. In this connection, it has been found that locating the score lines 28 on the exterior or outside of the bottom 22 provides reliable release before the danger level is reached while permitting the maximum residual thickness. Locating the score lines on the exterior of the bottom may result in release at a pressure of 20 p.s.i. lower than locating the same score lines having the same residual thickness on the interior of the bottom.

As shown in FIGS. 4 and 5, a very small opening is created at point 30 when the bottom 22 ruptures at the score lines 28. This is extremely important since the score lines are located at the bottom of the aerosol can and the bottom is usually used to support the can on a horizontal surface. If the rate of flow through the opening is excessive, the can will be upset or perhaps even propelled off the horizontal surface. It has been found that the spoke-like scoring on a flattened area of the aerosol can bottom will produce an opening having a limited flow rate which is not sufficient to upset the can on the horizontal surface since the expelled fluid is able to seep between the horizontal surface and a double seam of the bottom 22 at a sufficient rate to accommodate the rate of flow through the opening.

Figure 8:
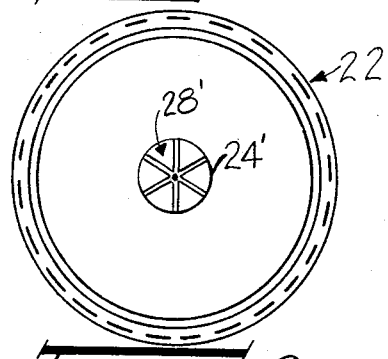
FIG. 8 is a plan view of the exterior side of a can bottom showing a modified score line configuration.

The six spoke configuration for the valve of FIG. 8 is similar to the eight spoke scoring configuration in FIG. 3. Preferably, the flattened area 24' for the six-spoke valve and the flattened area 24 of the eight-spoke valve have three-fourths inch diameters where 135 lb. T-5 steel is utilized to achieve release at 180 p.s.i. The doming radius is 2.319 inches ± 0.050 inches and the overall diameter of the domed bottom as measured from the interior of the double seam is approximately 2.553 inches for both embodiments so that the flat area in both embodiments has a diameter of less than one third the diameter of the bottom.

A method for making a safety valve comprising the compound score lines 28 in the centrally located flat area 24 will now be described with reference to FIGS. 9 (a-e). FIG. 9a shows a portion of a domed bottom 22a prior to flattening and scoring. FIG. 9b shows an anvil 50 in combination with a punch 52 for rough scoring and simultaneously flattening the central area of the bottom 22a. The bottom 22a is held between the supporting surface 54 of the anvil 50 and the scoring surface 56 on the punch 52 to form the rough scored and centrally flattened bottom 22b as shown in FIG. 9c. In some instances, it may be desirable to flatten and score in separate steps.

The rough scored and flattened bottom 22b then assumes a position between the fine scoring punch 60 and an anvil 58. When the fine scoring surface 64 of the punch 60 closes on the bottom 22b which rests on a stepped anvil surface 62 of the anvil 58, the fine scored bottom 22c as shown in FIG. 9e is obtained.

An eight-spoke configuration for the rough scoring surface 56 is shown in FIG. 10. Flats 68 form the base 34 of the rough score lines while inclined surfaces 66 form the walls of the rough score lines. An eight-spoke fine scoring surface 64 is shown in FIG. 11. Flats 70 form the base 36 of the fine score line while inclined surfaces 72 form the walls 40 of the fine score lines as shown in FIG. 6. Finally, FIG. 12 shows a plan view of the stepped anvil 62. The central stepped area 64 of the anvil 62 permits the residual thickness of the score lines in the region 27 located beneath this stepped area to have a lesser residual thickness than the area 29 of the score lines.

In accordance with another embodiment of this invention as shown in FIGS. 13 and 14, the aerosol can of FIG. 1 is provided with a safety valve comprising a bulging or bubble-like area 124 which is centrally located in the domed bottom 22 and surrounded by an outwardly concave peripheral area 126. The several score lines 128 (a-h) in the bubble-like area 124 meet at a common point 130 to form a spoke-like design. The score line pairs 128a and 128e, 128b and 128f, 128c and 128g, and 128d and 128h are located on diametrically opposite sides of the point 130.

In order to render the area 124 less resistant to everting than the surrounding area 126, the area 124 is circumscribed by a line of weakness in the form of a circular score line 132. As the pressure within the can builds up, the area 124 will evert outwardly as a result of the pressure build-up as shown in phantom in FIG. 13 so as to rupture the bottom 22 only at the point 130 thereby releasing the pressure build-up. However, the surrounding area 126 at the bottom 22 which is more resistant to everting than the area 124 will not evert.

Again, in accordance with this invention, the bottom 22 will rupture at a pressure no less than 170 p.s.i. and a pressure no greater than 200 p.s.i. In order to achieve the pressure release within this pressure range, the various aspects of the valve must be carefully controlled. For example, the residual thickness of the score lines 128 (a-h) should be 0.002 to 0.005. Actually, it has been found that a residual thickness of 0.004 inches in the region 127 of the spokes or lines 128 and a residual thickness of 0.003 inches in the region 129 of the spokes 128 which lies beneath a nine thirty-seconds diameter circular indentation 125 is preferred to achieve a pressure release of 170 to 185 p.s.i. (see also FIG. 15c) The line of weakness 132 circumscribing the area 124 is achieved by scoring to a residual thickness of 0.010 inches. Thus the score line 132 has a greater residual thickness than the score lines 128 (a-h) although this is not indicated in FIG. 15c or 15e.

Another critical aspect of the valve shown in FIGS. 13 and 14 involves the dimensions of the bubble-like area 124. It has been found that an overall bubble diameter of three-fourths inch and a bubble radius of one inch are particularly effective. This will leave an overall bubble-height of approximately one-sixteenth inch. The foregoing specifications apply to a bottom 22 of 135 lb. T-5 steel (0.015 inches thick). The doming radius is again 2.319 inch ± 0.050 inches and the overall diameter of the domed bottom as measured from the interior of the double-seam is approximately 2.553 inches.

A method of making a safety valve comprising the bulging or bubble-like area circumscribed by a line of weakness and having score lines located inwardly of the line of weakness will now be described with reference to FIGS. 15 (a-e). FIG. 15a shows a portion of a domed bottom 122a before scoring. FIG. 15b shows a flattening and scoring punch 152 having a scoring surface 153 in combination with an anvil 150 having a stepped supporting surface 151 for scoring the bottom 122a to form score lines 128a-h, 130 and 132 as shown in FIG. 15c. After scoring, the bottom 122c is placed between a doming die 156 and an anvil 154 to form the bulging area 124 as shown at FIG. 15e. Thus, the bottom is scored in the flat initially and then domed to form the bulging area 124.

Although a particular embodiment of the invention has been shown and described, it will be understood that various modifications may be made in that embodiment without departing from the spirit and scope of the invention as set forth in the appended claims. For example the bottom of the can may be entirely flat.

What is claimed is:

1. A method of making an aerosol container having a pressure release valve comprising the steps of:
   deforming an outwardly concave container bottom blank so as to form a relatively flat central portion therein;
   scoring said relatively flat central portion of said blank so as to form intersecting score lines; and
   double seaming said domed container bottom to a container body with the dome of said deformed and scored central portion extending upwardly into said container body such that said deformed and scored central portion of said container bottom has a lesser resistance to eversion resulting from pressure within said container than the portion of said container bottom surrounding said substantially flat and scored central portion.

2. The method of claim 1 wherein said scoring comprises the steps of forming a rough score line in said relatively flat portion and subsequently forming a fine score line at the base of said rough score line leaving a residual thickness of 0.002–0.005 inches.

3. The method of claim 1 wherein said scoring occurs substantially simultaneously with the deforming of said relatively flat portion of said container bottom blank.

4. A method of making an aerosol container having a pressure release valve comprising the steps of:
   forming a container bottom from a flat metallic member so as to have a pressure resistant peripheral portion formed from said member and a less pressure resistant and more centally located portion substantially surrounded by said peripheral portion, said less pressure resistant portion also being formed from said flat metallic member;
   scoring said less pressure resistant portion of said member so as to form intersecting score lines;
   double seaming said container bottom to a container body with said outwardly concave portion and said scored centrally located portion extending into said container body, said score lines being formed so as to rupture upon deformation of said less pressure resistant and more centrally located portion and before deformation of said pressure resistant peripheral portion.

5. The method of claim 4 wherein said step of forming comprises:
   forming said pressure resistant peripheral portion so as to be outwardly concave and forming said less pressure resistant, more centrally located portion so as to be relatively flat.

6. The method of claim 5 wherein said step of scoring comprises forming a rough score line in said more centrally located portion and forming a fine score line in the base of said rough score line leaving a residual thickness of 0.002–0.005 inches.

7. The method of claim 5 wherein said step of forming comprises
   forming said metallic member so as to form a relatively flat less pressure resistant and more centrally located portion; said method further comprising the step of
   deforming said relatively flat more centrally located portion after scoring so as to create a concave bulge having a radius of curvature less than said pressure resistant peripheral portion.

8. The method of claim 7 wherein said relatively flat portion is scored so as to form a score line along the periphery thereof.

9. A method of making an aerosol container having a pressure release valve comprising the following operations:
   weakening an integral metallic valve portion of a metallic concave container bottom blank so as to deform at a pressure relatively less than the pressure required to evert concave portions of said blank adjacent said valve portion; and
   scoring said weakened metallic valve portion so as to form intersecting score lines rupturing as said valve portion is deformed.

* * * * *